(12) United States Patent
Fassnacht et al.

(10) Patent No.: US 9,701,188 B2
(45) Date of Patent: Jul. 11, 2017

(54) METHOD FOR OPERATING A DRIVE DEVICE, AND A DRIVE DEVICE

(75) Inventors: Jochen Fassnacht, Calw (DE); Rainer Kern, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1151 days.

(21) Appl. No.: 12/668,045

(22) PCT Filed: Jul. 2, 2008

(86) PCT No.: PCT/EP2008/058484
§ 371 (c)(1),
(2), (4) Date: Jan. 7, 2010

(87) PCT Pub. No.: WO2009/019085
PCT Pub. Date: Feb. 12, 2009

(65) Prior Publication Data
US 2010/0175938 A1     Jul. 15, 2010

(30) Foreign Application Priority Data

Aug. 8, 2007    (DE) .......................... 10 2007 037 352

(51) Int. Cl.
*B60W 10/00*       (2006.01)
*B60K 6/48*        (2007.10)
(Continued)

(52) U.S. Cl.
CPC ............. *B60K 6/48* (2013.01); *B60W 30/194* (2013.01); *B60K 2001/008* (2013.01);
(Continued)

(58) Field of Classification Search
CPC ............. B60W 20/104; B60W 20/106; B60W 20/1062; B60W 2510/0676;
(Continued)

(56) References Cited

U.S. PATENT DOCUMENTS 2,405,143 A * 8/1946 Holthouse ........................ 180/90
2,949,315 A * 8/1960 Taylor .............................. 180/41
(Continued)

FOREIGN PATENT DOCUMENTS

DE    3528673    2/1986
EP    1699106    9/2006
(Continued)

OTHER PUBLICATIONS

International Search Report, PCT International Patent Application No. PCT/EP2008/058484, dated Nov. 3, 2008.

*Primary Examiner* — Hau Phan
(74) *Attorney, Agent, or Firm* — Norton Rose Fulbright US LLP; Gerard Messina

(57) ABSTRACT

A method for operating a drive device of a vehicle, in particular a motor vehicle, which has an internal combustion engine, at least one electric machine, and at least one heatable electric accumulator, in particular a lithium ion battery, power being drawn from the electric accumulator for starting the internal combustion engine with the aid of the electric machine. It is provided that, after the start of the internal combustion engine and until the heated electric accumulator reaches a predefined minimum temperature, the electric accumulator is operated without load. Furthermore, a drive device for a vehicle, in particular for carrying out the above-described method is provided.

21 Claims, 3 Drawing Sheets

(51) Int. Cl.
*B60W 30/194* (2012.01)
*B60K 1/00* (2006.01)
*B60W 10/26* (2006.01)

(52) U.S. Cl.
CPC ....... *B60W 10/26* (2013.01); *B60W 2510/246* (2013.01); *Y02T 10/6221* (2013.01)

(58) Field of Classification Search
CPC ... B60W 2710/0694; B60W 2710/246; B60W 30/18127; B60W 30/192; B60W 10/11; B60W 10/113; B60W 2050/146; B60W 20/108; B60W 20/1082; B60W 2710/0688; B60W 2710/182; B60W 2710/244; B60W 2720/103; B60W 30/18; B60W 30/1882; B60W 30/1886; B60W 30/19; B60W 30/194; B60W 50/0097; Y02T 10/7005; Y02T 10/7077; Y02T 10/705; B60L 11/14; B60L 11/123; B60L 2240/445; B60L 11/1861; B60L 1/02; B60L 2240/36; B60L 2240/423; B60L 2240/545; B60L 11/1811; B60L 11/1851; B60L 15/2045; B60L 2240/34; B60L 11/1875
USPC ......... 180/54.1, 65.1, 65.21, 65.265, 65.275, 180/65.285, 65.29; 903/903, 907
See application file for complete search history.

(56) References Cited

U.S. PATENT DOCUMENTS

| | | | |
|---|---|---|---|
| 4,650,729 A | 3/1987 | Nakamura et al. | |
| 5,224,335 A * | 7/1993 | Yoshizaki | F01N 3/2026 60/277 |
| 5,730,237 A | 3/1998 | Matsuki et al. | |
| 5,839,656 A | 11/1998 | Yamano et al. | |
| 5,904,902 A * | 5/1999 | Matuoka | F01N 3/20 422/174 |
| 6,072,301 A | 6/2000 | Ashtiani et al. | |
| 6,078,163 A | 6/2000 | Horie et al. | |
| 6,081,095 A * | 6/2000 | Tamura et al. | 320/118 |
| 6,148,910 A * | 11/2000 | Warner | B60H 1/00278 165/297 |
| 6,151,890 A * | 11/2000 | Hoshi | F01N 3/0807 60/285 |
| 7,145,788 B2 * | 12/2006 | Plummer | 363/141 |
| 7,213,665 B2 * | 5/2007 | Yamaguchi | B60K 6/445 180/65.27 |
| 7,584,813 B2 * | 9/2009 | Yoshida | 180/65.29 |
| 7,730,981 B2 * | 6/2010 | McCabe et al. | 180/65.225 |
| 2003/0088343 A1* | 5/2003 | Ochiai et al. | 701/22 |
| 2004/0053087 A1* | 3/2004 | Akikusa et al. | 429/20 |
| 2006/0097577 A1* | 5/2006 | Kato et al. | 307/10.1 |
| 2006/0196954 A1 | 9/2006 | Okuda et al. | |
| 2006/0241826 A1* | 10/2006 | Ishishita et al. | 701/22 |
| 2008/0053715 A1* | 3/2008 | Suzuki et al. | 180/2.1 |
| 2008/0282673 A1* | 11/2008 | Gonze | B60K 6/445 60/284 |
| 2008/0282674 A1* | 11/2008 | Gonze | B60K 6/48 60/285 |
| 2011/0092328 A1* | 4/2011 | Tiwari et al. | 475/5 |
| 2011/0270481 A1* | 11/2011 | Koga et al. | 701/22 |

FOREIGN PATENT DOCUMENTS

| | | | |
|---|---|---|---|
| JP | 61-10918 | 1/1986 | |
| JP | 10-12286 | 1/1998 | |
| JP | 2001-257011 | 9/2001 | |
| JP | 2002-107042 | 4/2002 | |
| JP | 2003-341448 | 12/2003 | |
| JP | 2006-291754 | 10/2006 | |
| JP | 2007-12568 | 1/2007 | |
| JP | WO 2010079794 * | 7/2010 | ............ B60W 30/18 |
| WO | WO 2004108468 A1 * | 12/2004 | .............. B60L 11/12 |
| WO | WO 2010017900 A1 * | 2/2010 | ............... B60H 1/00 |

* cited by examiner

METHOD FOR OPERATING A DRIVE DEVICE, AND A DRIVE DEVICE

FIELD OF THE INVENTION

The present invention relates to a method for operating a drive device of a vehicle, in particular a motor vehicle, which has an internal combustion engine, at least one electric machine, and at least one electric accumulator, in particular a lithium ion battery, power being drawn from the electric accumulator for starting the internal combustion engine with the aid of the electric machine.

Furthermore, the present invention relates to a drive device for a vehicle, in particular a motor vehicle, in particular for carrying out the above-named method, which has an internal combustion engine, at least one electric machine, and at least one electric accumulator.

BACKGROUND INFORMATION

Conventionally, in drive devices of a vehicle which have an internal combustion engine and an electric machine, so-called hybrid drive devices, the internal combustion engine is started with the aid of the electric machine, the necessary power for the electric machine, which is operated as a motor in this case, being drawn from an electric accumulator of the drive device. Since operating an electric accumulator of this type at low temperatures, in particular at temperatures below 0° C., may result in rapid aging of the electric accumulator, it may be provided, as described in Japanese Patent Application No. JP 2003-341448 A, to heat the electric accumulator, so that it rapidly reaches a desired operating temperature or a minimum temperature.

SUMMARY

According to an embodiment of the present invention, after the start of the internal combustion engine and until the heated electric accumulator reaches a predefined minimum temperature, the electric accumulator is operated without load. After power has been drawn from the electric accumulator for starting the internal combustion engine, the electric accumulator is thus advantageously operated without load until it has reached the predefined minimum temperature. For the electric accumulator to rapidly reach the minimum temperature, it is heated during and/or after the start of the internal combustion engine until the electric accumulator has reached the predefined minimum temperature. Due to the no-load operation of the electric accumulator, which is also to be understood as an almost no-load operation, i.e., due to the operation of the electric accumulator without, or without major, charging and/or discharging processes, the electric accumulator is not stressed until the minimum temperature is reached, so that rapid aging of the accumulator, in particular of the lithium ion battery, is prevented. After reaching the minimum temperature, the electric accumulator is operated "normally" again, the power then generated by the electric machine operated as a generator being first supplied to the electric accumulator, so that it reacquires the power drawn from it for the start. At low temperatures, the electric accumulator is conveniently operated at a high SOC (state of charge). Finally, it is provided that the electric accumulator is heated until it has reached a minimum temperature of 0° C. Loading or stressing the electric accumulator above 0° C. does not substantially affect the aging of the electric accumulator.

According to a refinement of the present invention, heat energy from an exhaust gas of the internal combustion engine is supplied for heating the electric accumulator. This means that the heat energy of the exhaust gas is used here to heat or warm the electric accumulator. For this purpose, the electric accumulator is advantageously installed in the vehicle near the exhaust system of the internal combustion engine.

According to a refinement of the present invention, a heated liquid and/or gaseous medium is supplied to the electric accumulator, whose heat energy heats the electric accumulator. The liquid and/or gaseous medium is used as a carrier for the heat energy of the exhaust gas, i.e., for the heat energy drawn from the exhaust gas.

It is furthermore provided that the medium is directed through and/or along the electric accumulator. For this purpose, the electric accumulator preferably has at least one flow channel which is directed along the accumulator or a housing of the accumulator and/or is directed through the accumulator.

According to a refinement of the present invention, an air stream, in particular a fresh air stream, is used as the medium, which receives heat energy from the exhaust gas with the aid of at least one heat exchanger. It is thus provided to supply an air stream that has received heat energy drawn from the exhaust gas to the electric accumulator, the heat energy being preferably drawn from the exhaust gas with the aid of a heat exchanger and supplied to the air stream. For this purpose, the heat exchanger is advantageously placed directly on the exhaust system, i.e., on a pipe of the exhaust system conducting the exhaust gas, particularly preferably upstream from a catalytic converter of the exhaust system.

Alternatively, it is provided that the exhaust gas of the internal combustion engine itself is used as the medium. In this case, the exhaust gas or part thereof is directly supplied to the electric accumulator, so that the heat energy contained in the exhaust gas is directly transferred to the electric accumulator.

Particularly preferably it is provided that the medium such as the air stream or the exhaust gas, for example, is directed through the heat exchanger and/or the electric accumulator and/or past the electric accumulator, as a function of an instantaneous accumulator temperature of the electric accumulator. This allows, for example, the rate at which the electric accumulator is heated to be adjusted and, after reaching the minimum temperature, the heating process may be terminated by directing the medium past the heat exchanger and/or the electric accumulator. This may be achieved, for example, with the aid of a bypass.

Alternatively and/or additionally, it is provided that high-frequency current signals are generated in the electric accumulator for heating the electric accumulator. Due to the great time constant of the chemical system of the electric accumulator, the high-frequency current signals do not affect this system, so that no charging and/or discharging processes take place. However, due to the current flow, losses occur in the piping and on the electrodes, which heat the electric accumulator. The charge of at least one capacitor of the electric accumulator is reversed with the aid of the high-frequency current signals for heating. The current signals are preferably generated at a frequency greater than 200 Hz. Any components of a (traction) electrical system of the drive device may be used for generating the high-frequency current signals as long as they have their own energy accumulator. The necessary power is drawn from the internal combustion engine via the electric machine.

Since the resistors of a connection system of the electric accumulator and, of course, its electrode resistances are also involved in the charge reversal processes, high-frequency current signals of this type may be used for gently heating the electric accumulator. In this case, the performance of the electric accumulator or its charge capacity is not stressed and therefore it is operated without load.

It is furthermore provided that, to generate the high-frequency current signals, at least one DC/DC converter or inverter is used, which is often already present in hybrid drive devices and may therefore be easily used for the purpose of the present invention. The power then oscillates between the electric accumulator and an intermediate circuit capacitor of the DC/DC converter or between the electric accumulator and the electric machine when the inverter is used. The losses are covered by the electric machine operating as a generator.

According to an advantageous refinement of the present invention, the high-frequency current signals are generated via a highly dynamic regulation of the electric machine.

Furthermore, to adjust the no-load operation of the electric accumulator, an accumulator current regulation using a current setpoint value equal to zero or a high-frequency current setpoint value is used for heating. Alternatively or additionally, to adjust the no-load operation of the electric accumulator, an accumulator power regulation using a power setpoint value equal to zero or a high-frequency power setpoint value is used for heating. Finally, it is provided that passenger compartment air or passenger compartment heating (engine waste heat) is used for heating.

The example drive device according to the present invention advantageously has an arrangement for heating the electric accumulator, which is without load or almost without load after the start of the internal combustion engine until the minimum temperature is reached.

The arrangement advantageously include at least one flow channel supplying a heated liquid and/or gaseous medium to the electric accumulator. The flow channel is conveniently directed through and/or along at least some areas of the electric accumulator. For this purpose, the electric accumulator preferably has a housing which forms or has at least one area of the flow channel.

In a refinement of the present invention, the medium is an air stream, in particular a fresh air stream, the arrangement also including at least one heat exchanger which heats the air stream using the heat energy drawn from the exhaust gas. For this purpose, the heat exchanger is preferably associated with an exhaust system of the internal combustion engine. The flow channel is conveniently directed through the heat exchanger, which is situated in the flow direction upstream from the electric accumulator.

A bypass, which is adjustable as a function of the instantaneous accumulator temperature, is furthermore provided for the medium. The bypass is preferably associated with the heat exchanger and/or the electric accumulator. The rate of the temperature increase of the electric accumulator may thereby be influenced, for example. The heating process may also be easily terminated thereby after the electric accumulator has reached the predefined minimum temperature, the medium being directed past the electric accumulator and/or past the heat exchanger in this case.

In an alternative refinement of the present invention, the flow channel is advantageously designed as an exhaust gas flow channel, so that exhaust gas of the internal combustion engine, which has been heated by the combustion in the internal combustion engine, is supplied directly to the electric accumulator.

It is furthermore provided that the arrangement of the drive device include at least one device for generating high-frequency current signals in the electric accumulator. The high-frequency current signals cause ohmic losses to occur in the electric accumulator, which are used for "gently" heating the electric accumulator, as described above. The device is advantageously designed as a DC/DC converter.

It is finally provided that electric heating elements are placed in the electric accumulator or near the electric accumulator for heating.

BRIEF DESCRIPTION OF THE DRAWINGS

Below, the present invention is explained in greater detail with reference to the figures.

DETAILED DESCRIPTION OF EXAMPLE EMBODIMENTS

Figure 1:
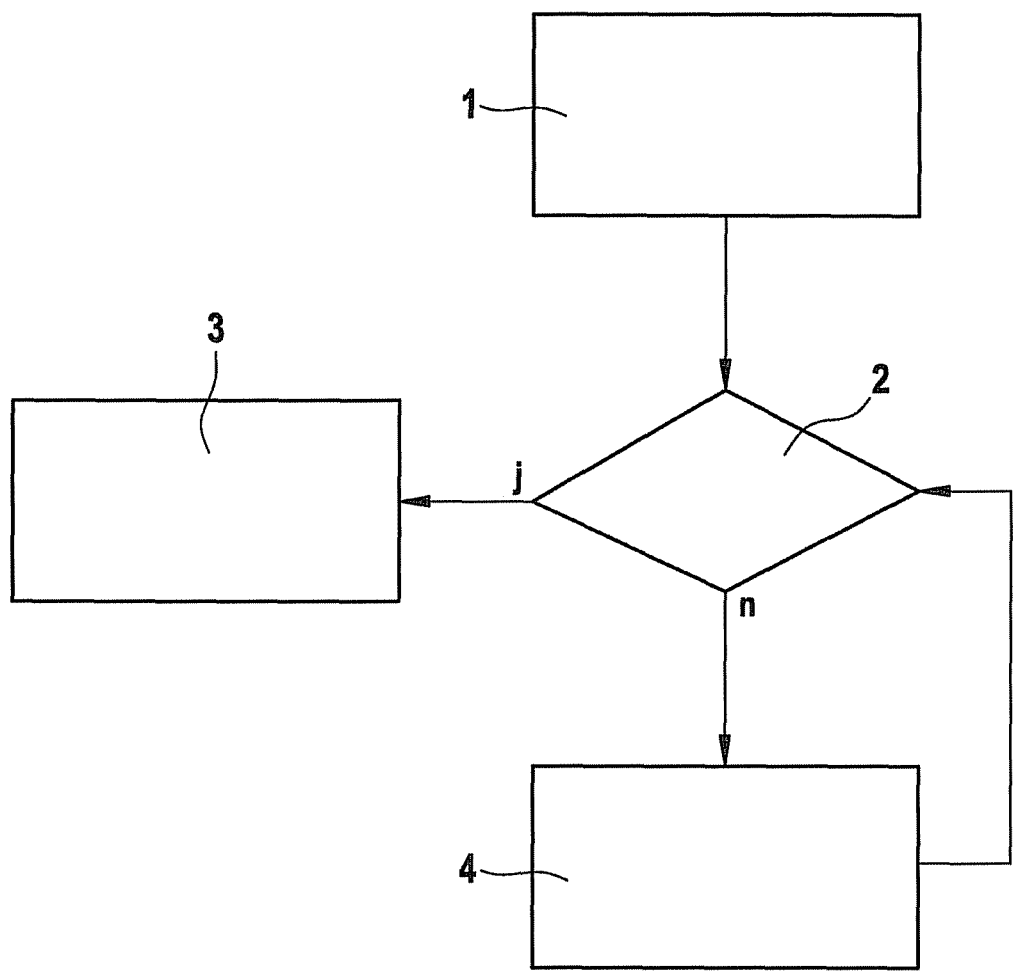
FIG. 1 shows an exemplary embodiment of an advantageous method for operating a drive device.

FIG. 1 shows, in a flow chart, an exemplary embodiment of an advantageous method for operating a drive device of a vehicle, which has an internal combustion engine, at least one electric machine, and at least one heatable electric accumulator. In a first step 1, the internal combustion engine is started with the aid of the electric machine, which is conveniently mechanically linked or linkable to the internal combustion engine. Power is drawn from the electric accumulator for operating the electric machine. When the internal combustion engine is started, the instantaneous temperature of the electric accumulator is ascertained in a query 2. If query 2 results in the instantaneous temperature of the electric accumulator corresponding to or exceeding a predefined minimum temperature of 0° C., for example, (j=yes), in a subsequent step 3 the drive device, which is actually designed as a hybrid drive device, is operated "normally." This means that, for example, power recovery operation, boost operation, and electric driving are possible. If query 2 results in the temperature being less than the predefined minimum temperature of the electric accumulator (n=no), in a subsequent step 4 it is determined that the electric accumulator will be operated without load, i.e., in such a way that no charging and/or discharging processes take place. At the same time, the electric accumulator is heated until query 2 results in the instantaneous temperature of the accumulator satisfying the predefined minimum temperature. As soon as this occurs, the drive device is operated "normally" (step 3) again and the heating of the electric accumulator is terminated.

Due to the no-load operation of the electric accumulator, which is designed in this case as a lithium ion battery, below the predefined minimum temperature of 0° C., for example, rapid aging of the accumulator is avoided, i.e., prevented. In particular, charging the lithium ion battery results in rapid aging. Due to the no-load operation and heating of the electric accumulator, on the one hand, rapid aging of the electric accumulator is prevented; on the other hand, it is achieved that the electric accumulator may be operated "normally" again shortly after the internal combustion engine is started. The required electric power may be generated by the electric machine operating as a generator during the phase of the no-load operation. The no-load operation of the energy accumulator may be achieved with an electric machine operating as a generator (in particular for supplying a vehicle electrical system) via accumulator charging current regulation using setpoint value 0. If heating is to be provided via ohmic losses, an AC current setpoint value without a DC component may be used in this regulation.

Figure 2:
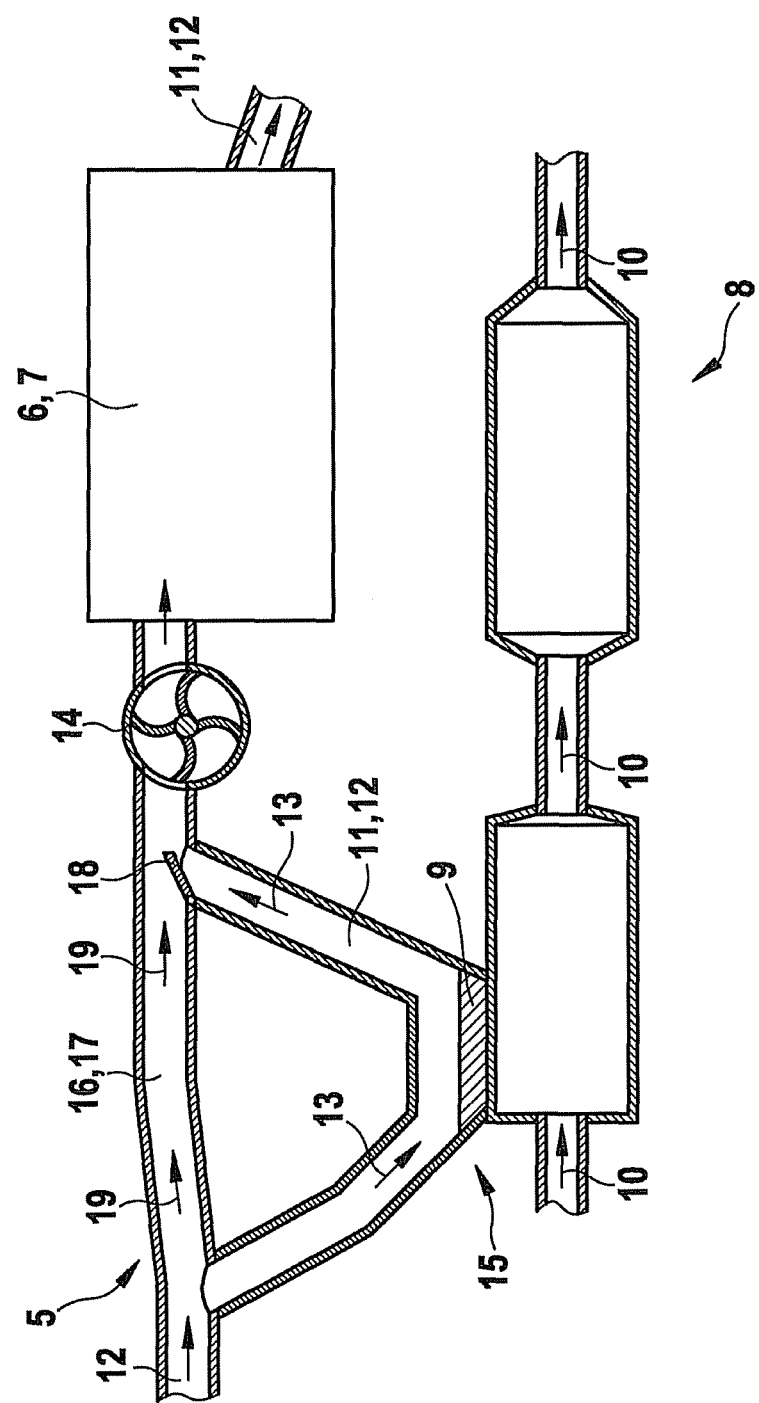
FIG. 2 shows a first exemplary embodiment of an advantageous drive device.
Figure 3:
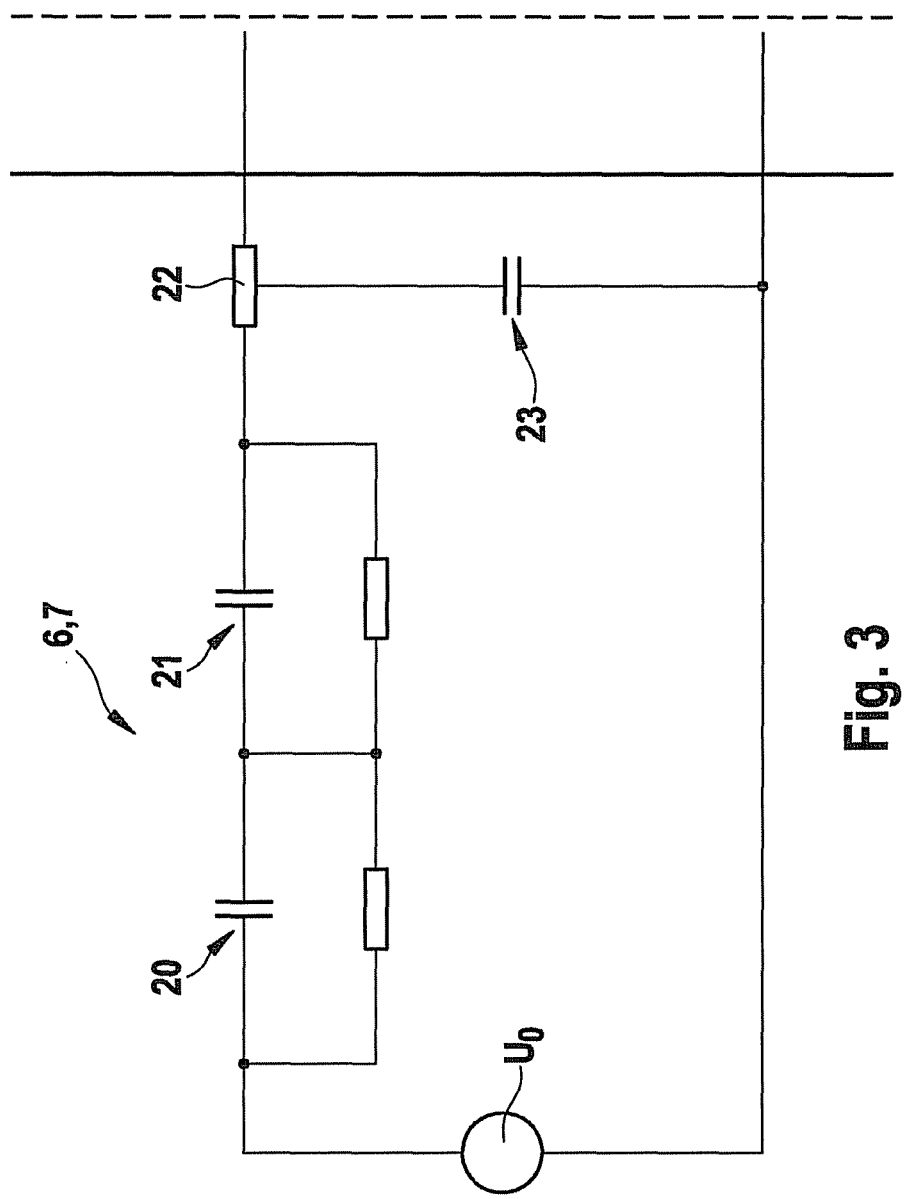
FIG. 3 shows an alternative diagram of an electric accumulator.

FIGS. 2 and 3 show exemplary embodiments of advantageous drive devices which make heating of the electric accumulator possible.

FIG. 2 shows a part of the above-described drive device 5. An electric accumulator 6, which is designed as a lithium ion battery 7, is depicted. Electric accumulator 6 is electrically connected to the electric machine (not depicted here), so that the latter may draw power from or supply power to electric accumulator 6. In the present exemplary embodiment, accumulator 6 is advantageously situated in the proximity of an exhaust system 8 of the internal combustion engine, which is also not depicted here. A heat exchanger 9, which is situated in the flow direction at the exhaust system downstream from a catalytic converter and draws heat energy from the exhaust gas flowing in the direction of arrows 10, is associated with exhaust system 8. A branch 11 of a flow channel 12 is directed through heat exchanger 9, the power drawn from the exhaust gas being supplied to a gaseous and/or liquid medium flowing through flow channel 12 in the direction of arrows 13. Of course, opposite flow directions of exhaust gas and medium are also possible. Branch 11 of flow channel 12 leads to an advantageous pump 14, which pumps the gaseous and/or liquid medium through flow channel 12 to electric accumulator 6 and through the same or through a housing of electric accumulator 6. Fresh air is advantageously directed through heat exchanger 9 and there heated using the heat energy drawn from the exhaust gas. The medium thus heated then flows through accumulator 6 or its housing and gives off heat energy to electric accumulator 6, so that the latter rapidly reaches its predefined minimum temperature of 0° C. Flow channel 12 and heat exchanger 9 form a heating arrangement 15 here, which are used for heating electric accumulator 6. To terminate the heating or to modify or adjust the rate of heating, a bypass 16 is provided, which is formed by a second branch 17 of flow channel 12. The volume flow of the medium through branch 11 along arrows 13 and the volume flow through second branch 17 of flow channel 12 or through bypass 16 along arrows 19 may be set via a valve 18. Valve 18 may be adjusted, for example, in such a way that branch 11 is closed and only fresh air is supplied to electric accumulator 6. The valve may also only partially close or unblock the particular branch 11, 17. Alternatively it is also possible that the heated exhaust gas itself or part thereof is directed through electric accumulator 6 or its housing or directed along it.

FIG. 3 shows an alternative or additional option for heating electric accumulator 6. FIG. 3 shows an alternative diagram of an electric accumulator. An ideal voltage source $U_0$ and two PT1 elements 20, 21 are depicted. Furthermore, the alternative diagram shows an ohmic resistor 22 and a plate capacitor 23 connected in parallel to ideal voltage source $U_0$. Ohmic resistor 22 is shown simplified for two internal resistors, between which plate capacitor 23 is connected.

Second PT1 element 21 basically represents the chemical reaction in the electric accumulator, which takes place at a slow rate. If electric accumulator 6 is excited with a frequency of 200 Hz, the charge of the plate capacitor is reversed without affecting the chemical system. Due to the charge reversal of the plate capacitor, heat is generated in the ohmic resistors, which heat electric accumulator 6. No charging and/or discharging processes take place due to the high-frequency current signal with the help of which accumulator 6 is excited. This makes it possible to operate electric accumulator 6 without load and to heat it electrically; the power needed for excitation may be provided, for example, by the electric machine operating as a generator. During the time after start until the electric accumulator reaches its predefined minimum temperature, the drive device is operated "conventionally." Different components of the (traction) electrical system of the vehicle may be used for generating the high-frequency current signals, which, however, must have an energy accumulator of their own. If this is a system having an additional DC/DC converter for connecting an intermediate circuit and the (traction) electrical system, the latter may be used. The power then oscillates between the electric accumulator and the intermediate circuit capacitor, the losses being covered via the generator operation of the electric machine.

It is also possible to rapidly modify the current flow with the aid of a highly dynamic regulation of the electric machine and thus to implement a high-frequency excitation of the electric accumulator.

What is claimed is:

1. A method for operating a drive device of a motor vehicle, which has an internal combustion engine, at least one electric machine, and at least one heatable battery, power being drawn from the at least one heatable battery for starting the internal combustion engine with the aid of the electric machine, the method comprising:
   after starting the internal combustion engine and until the heated at least one heatable battery reaches a predefined minimum temperature, operating the at least one heatable battery in such a way that no charging and no discharging processes take place, wherein at least one of a heated liquid and gaseous medium is supplied to the at least one heatable battery.

2. The method as recited in claim 1, wherein the at least one heatable battery is a lithium battery.

3. The method as recited in claim 1, wherein heat energy from an exhaust gas of the internal combustion engine is supplied to the at least one heatable battery for heating.

4. The method as recited in claim 1, wherein the medium is directed at least one of: i) through the at least one heatable battery, and ii) along the at least one heatable battery.

5. The method as recited in claim 1, wherein a fresh air stream is used as the medium, which receives heat energy from exhaust gas using at least one heat exchanger.

6. The method as recited in claim 1, wherein an exhaust gas is used as the medium.

7. The method as recited in claim 1, wherein the medium is directed as a function of an instantaneous temperature of the at least one heatable battery.

8. The method as recited in claim 1, wherein high-frequency current signals are generated in the at least one heatable battery for heating the at least one heatable battery.

9. The method as recited in claim 8, wherein the at least one heatable battery includes at least one plate capacitor, and a charge of at least one plate capacitor of the battery is reversed using the high-frequency current signals.

10. The method as recited in claim 9, wherein at least one DC/DC converter is used to generate the high-frequency current signals.

11. The method as recited in claim 9, wherein the high-frequency current signals are generated via a highly dynamic regulation of the electric machine.

12. The method as recited in claim 1, wherein, to adjust the no-load operation of the at least one heatable battery, an accumulator current regulation using a current setpoint value equal to zero or a high-frequency current setpoint value is used for heating.

13. The method as recited in claim 1, wherein, to adjust the no-load operation of the at least one heatable battery, an accumulator power regulation using a power setpoint value equal to zero or a high-frequency power setpoint value is used for heating.

14. The method as recited in claim 1, wherein one of warmed-up passenger compartment air or a passenger compartment heating system is used for heating.

15. A drive device for a motor vehicle, which includes an internal combustion engine, at least one electric machine, and at least one heatable battery, the internal combustion engine being startable using the electric machine by drawing power from the at least one heatable battery, the drive device comprising:
  a heating arrangement to heat the at least one heatable battery, the battery being operated in such a way that no charging and no discharging processes take place after a start of the internal combustion engine until the battery reaches a predefined minimum temperature, wherein the heating arrangement includes at least one flow channel to supply at least one of a heated liquid and gaseous medium to the at least one heatable battery.

16. The drive device as recited in claim 15, wherein at least in some areas, the flow channel is directed at least one of through and along the at least one heatable battery.

17. The drive device as recited in claim 15, wherein the heating arrangement includes a heat exchanger associated with an exhaust system of the internal combustion engine for heating the medium.

18. The drive device as recited in claim 15, further comprising:
  a bypass for the medium, associated with one of the heat exchanger and the at least one heatable battery, which is adjustable as a function of an instantaneous accumulator temperature.

19. The drive device as recited in claim 15, wherein the flow channel is an exhaust gas flow channel.

20. The drive device as recited in claim 15, wherein the heating arrangement includes at least one DC/DC converter to generate high-frequency current signals in the at least one heatable battery.

21. The drive device as recited in claim 15, wherein electric heating elements are arranged one of in the battery or near the at least one heatable battery for heating.

* * * * *